Feb. 1, 1966  A. MALICHEFF  3,232,731
METHOD AND APPARATUS FOR THE SKIMMING OF MOLTEN GLASS
Filed June 22, 1962
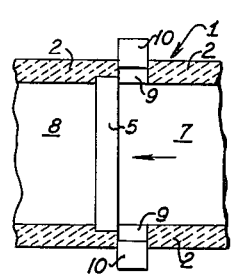
FIG. 1
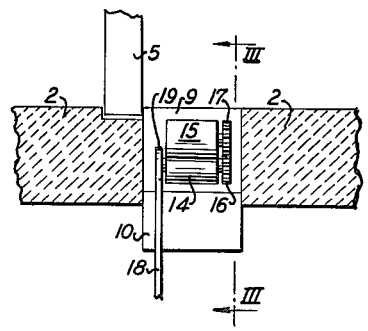
FIG. 2
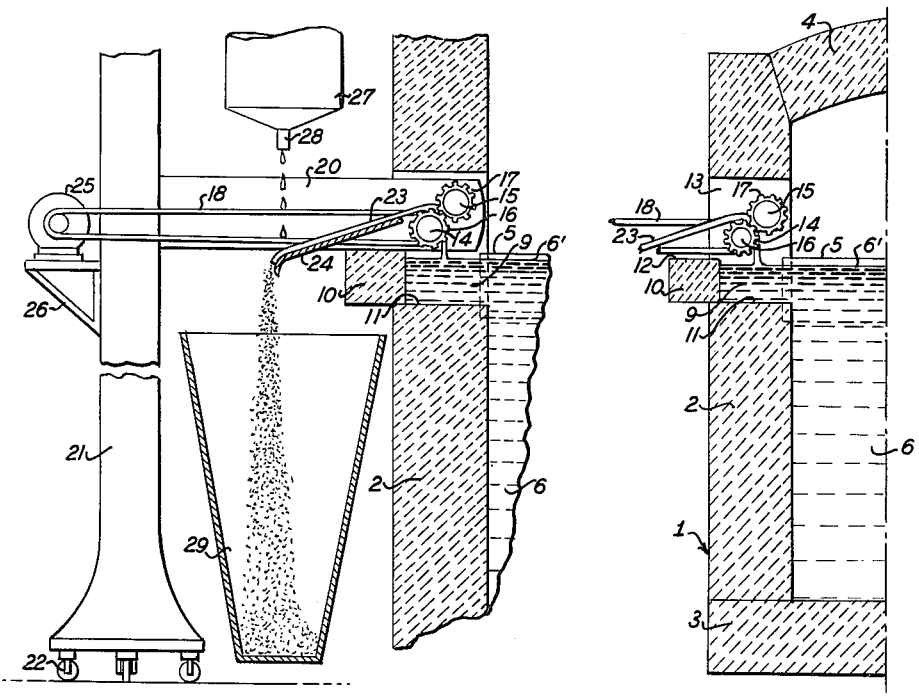
FIG. 4
FIG. 3
INVENTOR
ANDRE MALICHEFF
BY *John F. Hart* ATTORNEY United States Patent Office 3,232,731
Patented Feb. 1, 1966

3,232,731
METHOD AND APPARATUS FOR THE SKIMMING OF MOLTEN GLASS
André Malicheff, Lissewege, Belgium, assignor to S. A. Glaverbel, Brussels, Belgium, a company of Belgium
Filed June 22, 1962, Ser. No. 204,482
Claims priority, application Belgium, July 7, 1961, 482,603, Patent 605,862
4 Claims. (Cl. 65—27)

The present invention is concerned with the melting of glass, and more particularly with eliminating the surface layer of the glass bath in glassworks furnaces.

In continuous melting furnaces, the molten glass flows from the melting zone towards the utilisation zone. One or more barriers are arranged transversely of the path of travel of the molten glass. These barriers, which can be constituted by immersed self-floating refractory parts or by fixed shields penetrating into the upper portion of the glass bath, have more particularly the effect of retaining not only the impurities which float on the glass bath but also the surface layer of the glass, which is often of a heterogeneous nature. In fact, it happens that the surface layer of molten glass has a slightly different composition from the glass therebelow and is richer in silica, which gives a slightly inferior density; moreover, the surface tension of the glass in the upper layer, relatively to that of the lower glass, is such that it is an obstacle to keeping the mixture uniform. Now, it has been found that, contrary to what might be expected, this surface layer is not entirely entrained by the convection currents returning towards the melting zone but that the surface glass in the vicinity of the walls of the furnace is carried along by currents which descend below the barrier in the direction towards the working zone.

The object of the present invention is to provide a method and an apparatus for skimming this surface glass. According to this method, the surface layer of the glass is removed at shallow regions of the glass bath upstream of the barrier element, and the glass removed is discharged towards the exterior of the furnace. The shallow regions of the glass bath are uninfluenced by descending currents and calm zones can form therein. The surface glass from the calm zone is discharged by drawing it in a continuous band or strand towards the exterior of the furnace, where it is fractionated for example by cooling it violently and locally.

The apparatus for carrying the invention into effect comprises in each wall of the furnace, immediately before the barrier, a shallow recess so arranged that its upper wall be situated above the level of the glass bath and its lower wall is at a slight distance below this level. The recess is advantageously formed by the wall blocks, one of which is set back relatively to the others. A drawing device situated in the recess above the glass bath comprises two small cylinders having straight or curved generatrices, preferably corrugated cylinders, whose axes, parallel to one another and to the wall of the furnace, are arranged in an inclined plane such that the cylinder situated towards the interior of the furnace is on a higher level than the other cylinder. These cylinders are driven in rotational movement at a regulatable speed and in opposite directions to one another so as to direct the ribbon of glass drawn between them out towards the exterior of the furnace through an appropriate aperture in the furnace wall. A tank equipped with a dropping tube arranged outside the furnace causes drops of cold liquid to fall on the glass ribbon, effecting a continuous shattering of the glass ribbon as it issues from the furnace.

One form of embodiment of the invention is illustrated by way of example in the accompanying drawings.

FIGURE 1 is a partial plan view of a glassworks furnace equipped with the apparatus forming the subject of the invention.

FIGURE 2 is a detailed view of one wall of the furnace equipped with the apparatus.

FIGURE 3 is a vertical sectional view on the line III—III of FIGURE 2.

FIGURE 4 shows the constructional details of the apparatus.

According to FIGURES 1, 2 and 3 the furnace 1 is formed of the walls 2, the floor 3 and the roof 4. A floating barrier 5 arranged transversely retains the surface layer of the glass 6, coming from the melting zone 7 and travelling towards the working zone 8. Recesses 9 are formed in the walls 2 level with the glass bath 6' immediately upstream of the barrier 5. These recesses, into which the molten glass spreads, are formed by the blocks constituting the wall 2 and one of which, the block 10 in the drawings (more especially FIGURE 3) is set back in such a manner that the lower face 11 of the recess 9 is about 15 to 25 centimetres below the level of the glass bath, and its upper face 12 is at a sufficient height to receive within this recess, above the glass bath, the discharge device which will be described hereinafter. An aperture 13 formed in the wall above the block 10 permits the said device to pass through. The said device comprising two knurled cylinders 14 and 15 parallel to one another and to the wall 2 of the furnace, their axes being arranged in an oblique plane as represented in FIGURES 3 and 4. The cylinders 14 and 15, situated at a slight distance from one another and coupled by gearwheels 16 and 17, are driven in opposite directions of rotation by means of a chain 18 acting on the wheel 19 fast with one of the cylinders, the cylinder 14 for example.

FIGURE 4 shows by way of example one form of embodiment of the drawing device, according to which the cylinders 14 and 15 are fixed between two parallel iron flats 20 fast with a supporting column 21 mounted on rollers 22. The axes of the cylinders are arranged in an oblique plane arranged at an angle of about 45°, so as to direct the drawn ribbon of glass 23 out of the furnace. A slideway 24 supports the said ribbon whilst it is still in the plastic state. A regulatable speed motor 25 fixed on a bracket 26 fast with the column 21 acts on the chain 18 which drives the cylinders. A water inlet or tank 27 situated above the assembly and provided with a dropping tube 28, causes water to fall drop by drop on the ribbon of glass 23, which is broken as it emerges and falls into the tub 29.

In order to bring the apparatus into operation, a foil one end of which is introduced into the glass bath is passed between the two cylinders. This foil is then drawn out and its draws after it the molten ribbon of glass 23; the latter passes between the cylinders 14 and 15, the rotation of which ensures a continuous drawing-off of the heterogeneous surface glass.

The invention is not, of course, limited to the forms of embodiment which have been described and illustrated by way of example, and modifications could be made thereto without departing from the scope of the invention.

I claim:
1. The method of removing the heterogeneous surface layer formed on a stream of molten glass flowing in a glass furnace from the melting zone thereof towards the working zone, comprising blocking the advancement of such surface layer at a given point intermediate such zones while permitting the body of the stream to flow past such point, forming from such stream adjacently upstream from said given point a laterally offset, localized shallow pool of relatively quiescent molten glass, pulling a strip of congealed glass from such blocked surface layer glass in a direction transverse to the flow of the body of the glass stream into said shallow pool, and extracting the strip by lifting it upwardly and outwardly from such shallow pool at a place located within the area of the latter, and continuously replenishing such strip of said surface layer glass from the surface layer glass blocked at said given point in the stream and drawn in onto such shallow pool by the removal of such strip.

2. In a glass furnace having a duct through which flows a stream of glass from a melting zone thereof toward the working zone, and barrier means in said duct for blocking the advancement of the heterogeneous surface layer formed on the molten glass stream while permitting the body of the stream to flow toward the working zone, a localized portion of the side wall of said duct located adjacently upstream of said barrier means being constructed to provide a laterally offset, localized, shallow recess in communication with the interior of said duct so that there is formed therein from the stream of molten glass in such duct a shallow pool of relatively quiescent molten glass, and to provide above said recess a drawing chamber having an opening in communication with the exterior of the furnace, and means in said drawing chamber for continuously pulling a strip of congealed glass from the blocked surface layer glass in said duct in a direction transverse to the flow of the body of the glass stream into said shallow recess, and for continuously extracting the strip by lifting it upwardly from such shallow pool at a place located within the area of said recess, and discharging said strip through said drawing chamber opening.

3. The construction defined in claim 2, in which said drawing means comprises two cooperating drawing cylinders arranged over the molten glass pool in said recess and having their longitudinal axes parallel to one another and to said duct wall.

4. The construction defined in claim 3, including supporting means located outside the furnace and extending through said opening into said drawing chamber, means for rotatably mounting said drawing cylinders on said supporting means, and means carried by said supporting means for actuating said cylinders.

References Cited by the Examiner
UNITED STATES PATENTS

| | | | |
|---|---|---|---|
| 1,347,181 | 7/1920 | Scohy | 65—343 |
| 1,538,229 | 5/1925 | Weaver | 65—134 |
| 1,751,045 | 3/1930 | Mambourg | 65—345 |
| 1,810,911 | 6/1931 | Ferngren | 65—134 |
| 1,872,477 | 8/1932 | Mambourg | 65—135 X |
| 1,916,668 | 7/1933 | Howard | 65—134 |

DONALL H. SYLVESTER, *Primary Examiner.*

F. W. MIGA, *Assistant Examiner.*